United States Patent
Handler et al.

(10) Patent No.: US 9,222,395 B2
(45) Date of Patent: Dec. 29, 2015

(54) METHOD FOR MONITORING A POLLUTANT CONVERSION CAPACITY IN AN EXHAUST GAS AFTERTREATMENT SYSTEM

(75) Inventors: Torsten Handler, Stuttgart (DE); Tobias Pfister, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 413 days.

(21) Appl. No.: 12/974,941

(22) Filed: Dec. 21, 2010

(65) Prior Publication Data
US 2011/0146239 A1    Jun. 23, 2011

(30) Foreign Application Priority Data
Dec. 21, 2009   (DE) .................... 10 2009 055 082

(51) Int. Cl.
*F01N 3/00* (2006.01)
*F01N 11/00* (2006.01)

(52) U.S. Cl.
CPC . *F01N 11/00* (2013.01); *Y02T 10/47* (2013.01)

(58) Field of Classification Search
USPC .................................... 60/274–324
See application file for complete search history.

(56) References Cited

U.S. PATENT DOCUMENTS

| | | | |
|---|---|---|---|
| 5,426,935 A * | 6/1995 | Ogawa ............... | F02D 41/1441 123/691 |
| 6,701,707 B1 * | 3/2004 | Upadhyay et al. .............. | 60/277 |
| 7,134,273 B2 * | 11/2006 | Mazur et al. ..................... | 60/286 |
| 7,325,393 B2 * | 2/2008 | Miura .............................. | 60/277 |
| 7,428,809 B2 | 9/2008 | Wickert et al. | |
| 7,555,895 B2 * | 7/2009 | Shirakawa et al. ............. | 60/277 |
| 7,624,628 B2 * | 12/2009 | Bartley ....................... | 73/114.75 |
| 8,099,946 B2 * | 1/2012 | Hinz et al. ....................... | 60/277 |
| 8,347,604 B2 * | 1/2013 | Hagimoto et al. .............. | 60/277 |
| 2005/0102999 A1 | 5/2005 | Schaller | |
| 2009/0158719 A1 * | 6/2009 | Hallstrom et al. .............. | 60/297 |
| 2010/0293925 A1 * | 11/2010 | Lahr et al. ...................... | 60/276 |
| 2011/0170102 A1 * | 7/2011 | Janssen et al. ................ | 356/438 |

FOREIGN PATENT DOCUMENTS

DE    101 59 849    6/2003
EP    1 640 578    3/2006

OTHER PUBLICATIONS

Gaseous Emmisions-Dieselnet, Feb. 1, 2001, https://www.dieselnet.com/tech/emi_gas.php.*

* cited by examiner

*Primary Examiner* — Jesse Bogue
(74) *Attorney, Agent, or Firm* — Kenyon & Kenyon LLP

(57) ABSTRACT

The present invention relates to a method for monitoring a pollutant conversion capacity of a catalytically coated, oxidizing exhaust gas aftertreatment component (29) in an exhaust gas system (13) of an internal combustion engine (15). A nitrogen oxide sensor (31, 32) is disposed in each case in the flow path of the exhaust gas upstream of and downstream of the oxidizing exhaust gas aftertreatment component (29), a capacity of said oxidizing exhaust gas aftertreatment component (29) for converting NO to $NO_2$ being ascertained from a comparison of the two signals (Z', Z") of the nitrogen oxide sensors (31, 32). Additional independent claims relate to an open-loop and/or closed-loop control device (17), a computer program and a computer program product.

8 Claims, 3 Drawing Sheets

METHOD FOR MONITORING A POLLUTANT CONVERSION CAPACITY IN AN EXHAUST GAS AFTERTREATMENT SYSTEM

This application claims benefit of Ser. No. 10 2009 055 082.8, filed 21 Dec. 2009 in Germany and which application is incorporated herein by reference. To the extent appropriate, a claim of priority is made to the above disclosed application.

BACKGROUND

The present invention relates to a method for monitoring a pollutant conversion capacity of catalytically coated, oxidizing exhaust gas aftertreatment components in an exhaust gas system of an internal combustion engine according to the preamble of claim 1 as well as to an open-loop and or closed-loop control device, a computer program and a computer program product according to the preamble of the respective coordinate claims. A monitoring of this type is, for example, typical when a three-way catalytic converter is used and is therefore per se prior art.

Stricter laws in the area of a diagnosis of emission related components require within the scope of on-board diagnostic systems (OBD) the monitoring of all exhaust gas aftertreatment components for compliance with limit values, which for the most part are specified as a multiple of the emission limit values. Complex exhaust gas aftertreatment systems are used in order to meet the required exhaust gas emission levels. SCR catalytic converters (selective catalytic reduction) among other things are used for the conversion of nitrogen oxides. A certain ratio of NO to $NO_2$ in the exhaust gas is necessary for the SCR catalytic converter to function optimally. The proportion of $NO_2$ should be at 50% or more. The $NO_2$ proportion in the untreated emissions of the internal combustion engine is significantly smaller as a rule. Typically said proportion is at about 10% there. The NO proportion is correspondingly at about 90% in said untreated emissions. In order to provide the suitable $NO_2$ concentration, an oxidation catalytic converter is disposed in the exhaust gas aftertreatment system upstream of the SCR catalytic converter, or a particle filter which is correspondingly catalytically coated is provided in order to oxidize NO to $NO_2$. An elevated $NO_2$ also facilitates a regeneration of the particle filter by oxygen from $NO_2$ molecules being used for the oxidation of carbon of the embedded soot particles. By reducing the particle loading in the particle filter, a lower flow resistance and a longer loading phase are achieved. Both have a positive effect on the engine emissions.

Because these factors are important for the compliance with emission limit values, there are requirements in the OBD legislation, which must be met, in addition to the properties of the components contributing to said compliance. For example, the monitoring of the coating of the oxidation catalytic converter is required. A lack of monitoring leads to a violation of the OBD legislation and carries with it initially a fine to be paid per vehicle. If the deficiency is not taken care of within a time period determined by the lawmaker, the registration of the vehicle in question is in danger of being revoked.

There is currently no prior art method which monitors catalytically coated exhaust gas components for their capacity to convert NO to $NO_2$.

According to the prior art, conclusions can be drawn about a $NO_2/NO$ concentration upstream of the SCR catalytic converter from operating parameters, respectively effect models. In the German patent specification DE 10 2998 004 222 A1, a measurement of the $NO_2$ concentration in the exhaust gas between an oxidizing emission control component and the SCR catalytic converter is initially defined when determining a reducing agent quantity. The reducing agent quantity is subsequently determined from operating parameters of the SCR catalytic converter as well as from the measurement for the $NO_2$ concentration in the exhaust gas between the oxidizing emission control component and the SCR catalytic converter.

The German patent specification DE 101 59 849 A1 indicates a method for the aftertreatment of exhaust gas of internal combustion engines, in particular for the reduction of a nitrogen oxide proportion of the exhaust gases, the nitrogen oxide being reduced in the presence of oxygen and a reducing agent. In so doing, at least a part of the NO present in the exhaust gas is previously converted to $NO_2$.

SUMMARY

The present invention distinguishes itself in each case from the prior art mentioned above by the special features of the independent claims. The invention is based upon signals from a nitrogen oxide sensor respectively disposed in the flow path of the exhaust gas upstream and downstream of the oxidizing exhaust gas aftertreatment component being evaluated. In so doing, a capacity of the oxidizing exhaust gas aftertreatment component to convert NO to $NO_2$ is ascertained from a comparison of the two signals of the nitrogen oxide sensors.

The nitrogen oxide sensor used relates to a commercially available, amperometric double chamber sensor, which evaluates a total nitrogen oxide proportion in the exhaust gas but has a varying sensitivity to NO and $NO_2$. Sensors of this kind are usually calibrated to NO so that the nitrogen oxide sensor precisely detects NO. $NO_2$ is on the other hand detected with a reduced sensitivity due to a larger molecule size and thereby slower diffusion so that $NO_2$ is detected with a measurement error of approximately 20%. Sensors of this kind are, for example, known from the European patent specification EP 1 640 578 A1 of the applicant.

As is known, a $NO/NO_2$ mixture flows through the oxidizing exhaust gas aftertreatment component, the exhaust gas having a very high NO content upon entry. When flowing through the oxidizing exhaust gas aftertreatment component, large proportions of NO are oxidized and thereby converted into $NO_2$. The mass flow remains unchanged in the process.

The invention is based on the idea of using the measurement error of the nitrogen oxide sensor for monitoring the conversion capacity of the oxidizing component of NO to $NO_2$. The respective nitrogen oxide proportion in the exhaust gas is measured according to the invention by the two nitrogen oxide sensors upstream of and downstream of the oxidizing exhaust gas aftertreatment component. A measuring position close to the engine in the vicinity of the exhaust valves or downstream of an exhaust gas turbocharger is particularly advantageous. Different measurement readings of the two nitrogen oxide sensors are ascertained upstream and downstream of said oxidizing exhaust gas aftertreatment component as a result of the changed $NO/NO_2$ ratio in an oxidizing exhaust gas aftreament component which is working properly. If there is no difference between the two readings, no or an insufficient $NO/NO_2$ conversion has taken place in said oxidizing exhaust gas aftertreatment component. This means that said oxidizing exhaust gas aftertreatment component is either not operational or not sufficiently operational.

Under real operating conditions, it is useful to define a threshold value for the difference between the measurement readings, whereat the functional capability of the oxidizing exhaust gas aftertreatment component is barely assessed to be sufficient. If said difference ascertained by means of the two nitrogen oxide sensors lies below the threshold value, said oxidizing exhaust gas aftertreatment component is assessed to be faulty by the on-board diagnostic system (OBD). When a plurality of oxidizing exhaust gas aftertreatment components are disposed in an exhaust gas system, a nitrogen oxide sensor can be disposed in each case upstream and downstream of each of the components; thus enabling each component to be separately monitored in an advantageously targeted manner.

The invention represents a reliably operating monitoring option, which meets the statutory OBD requirements.

It is particularly advantageous for a temporal average value of a difference between the two signals of the nitrogen oxide sensors to be formed over a predetermined length of time. The average value can thereby be ascertained either by a temporal integral formation, by a cumulative value formation or by using a low pass filter. By measuring nitrogen oxide concentrations over an extended length of time, possible temporary measurement errors can be compensated so that a reliable measurement result can be found.

In addition to this, it is advantageous for an operating phase of the internal combustion engine to be used to ascertain the conversion of NO to $NO_2$, in which a higher $NO_2$ proportion in the exhaust gas is expected downstream of the exhaust gas aftertreatment component. If such an operating phase occurs during a normal driving operation, it is used in an embodiment for diagnosing the motor vehicle. The suitable operating phase can be defined as a function of an engine rotational speed, an engine load, an engine, respectively exhaust gas system, temperature and/or an exhaust gas mass flow. Other operating parameters, which influence the exhaust emission characteristics of the internal combustion engine, can be taken into account as well. A preferred effective range for monitoring the conversion capacity lies above the so-called "light off" temperature, whereat a 50% conversion of NO to $NO_2$ exists. In conventional oxidation catalytic converters, this temperature lies between 180E and 280 EC.

The expectedly high $NO_2$ proportion in the exhaust gas downstream of the exhaust gas aftertreatment component is desired in order to be able to very effectively utilize the varying sensitivity of the nitrogen oxide sensor for NO and $NO_2$. For that reason, the $NO_2$ proportion of the entire quantity of the nitrogen oxides should be greater than 0.5. This is especially the case for lower rotational speeds and average loads. It can in particular be assumed in this case, that much NO is oxidized in the exhaust gas aftertreatment component so that markedly different NO/$NO_2$ ratios occur upstream and downstream of the exhaust gas aftertreatment component which is properly working.

The temporal mean can be formed if required over a plurality of operating phases of the internal combustion engine, which are separated from each other. The averaging is omitted in an alternative embodiment. Instead of this, a cumulative value of the difference Δ, which is formed over the allocated length of time, is compared with a predetermined threshold value.

Suitable operating conditions, in which a high $NO_2$ proportion in the exhaust gas is expected downstream of the exhaust gas aftertreatment component, can also be actively set in a test operation. That means that the internal combustion engine runs over a certain length of time in a predetermined test scenario under suitable operating conditions, and in so doing the monitoring of the NO/$NO_2$ conversion capacity is triggered. This can be done, for example, as a part of a vehicle maintenance service. A defective exhaust gas aftertreatment component, which is no longer oxidizing NO to $NO_2$, can thereby be detected.

Further advantages are derived from the following description and the accompanying figures and their explanation.

It goes without saying that the features previously mentioned and those still to be explained below cannot only be used in the respectively indicated combination but also in other combinations or standing alone without departing from the scope of the present invention.

BRIEF DESCRIPTION OF THE DRAWINGS

The following are shown in each case in schematic form.

DETAILED DESCRIPTION

Figure 1:
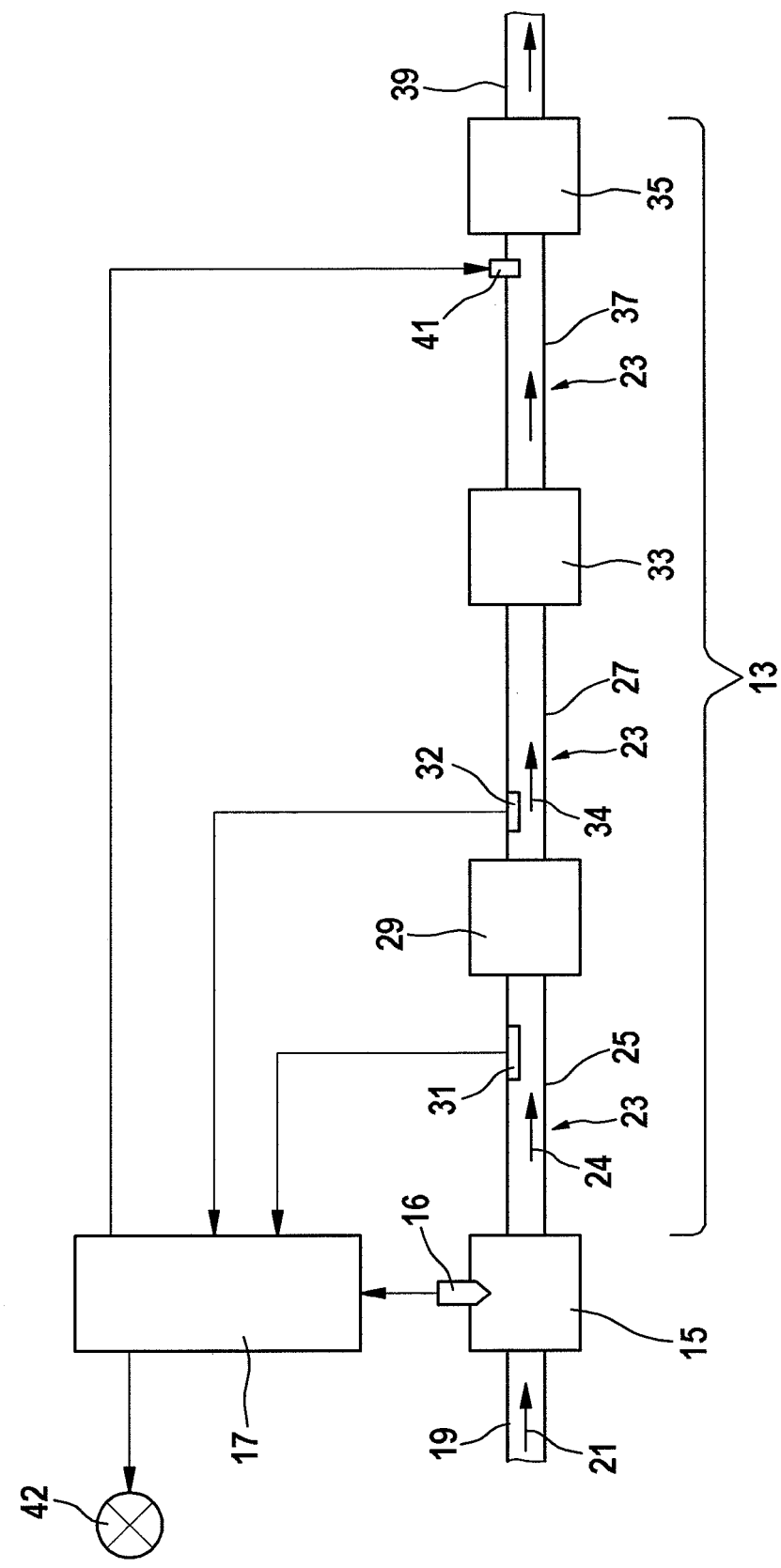
FIG. 1 the environment of the invention
FIG. 2 a characteristic diagram for assigning a signal value recognized by a nitrogen oxide sensor to a NO, respectively $NO_2$, concentration.

FIG. 1 shows an internal combustion engine 15 having an exhaust gas system 13 in a motor vehicle. The internal combustion engine 15 has injection valves 16 for fuel (in FIG. 1 only one injection valve 16 is depicted), which are connected to an open-loop and/or closed-loop control device of said internal combustion engine 11 which is configured as a control unit 17. Air (arrow 21) is drawn into the combustion chambers (not shown) of said internal combustion engine 15. The intake manifold 19 can alternatively or additionally have sensors for acquiring various state variables of the air 21, as, for example, an air temperature and/or an air pressure and/or an air mass flow (not depicted). In addition, a throttle device as an air quantity actuator can be provided in the intake manifold 19 for manipulating the air mass flow. An exhaust gas recirculation valve, a charging pressure valve or an actuator for adjusting the geometry of an exhaust gas turbocharger can also alternatively or additionally be used as an air quantity actuator. Furthermore, a compressor of the air system for compressing the air 21 supplied to the internal combustion engine 15 can be disposed in said intake manifold 19. In so doing, the compressor can in turn form a part of an exhaust gas turbo charger.

The exhaust gas system 13 has an exhaust gas pipe 23, which receives the exhaust gases 24 of the internal combustion engine 15. A catalytically coated, oxidizing exhaust gas aftertreatment component is disposed between a first section 25 and a second section 27 of the exhaust gas pipe 23. An oxidation catalytic converter 29 is assumed below to be the exhaust gas aftertreatment component. The explanations apply, however, in each case universally to catalytically coated oxidizing exhaust gas aftertreatment components. The oxidizing exhaust gas aftertreatment component can also, for example, be a catalytically coated particle filter, a three-way catalytic converter, a catalytically coated $NO_x$ storage catalytic converter or a combination of several of these four components.

An outlet of the oxidation catalytic converter 29 is connected to an inlet of a particle filter 33 via the second section 27 of the exhaust gas pipe 23. The exhaust gas flowing out of the oxidation filter 29 is denoted with the reference numeral 34. A first nitrogen oxide sensor 31 is disposed in the direction of flow upstream of said oxidation catalytic converter 29 and a second nitrogen oxide sensor 32 is disposed in the direction of flow between said oxidation catalytic converter 29 and the particle filter 33. Both nitrogen oxide sensors 31 and 32 are amperometric double chamber sensors, the signals of which are interrogated and processed by the control unit 17. In addition, the exhaust gas system 13 in the embodiment depicted has an SCR catalytic converter 35 (SCR=selective catalytic reduction). An SCR catalytic converter facilitates a selective catalytic reduction, which reduces nitrogen oxides in the exhaust gas in the presence of oxygen. The SCR catalytic converter 35 is connected on the inlet side to an outlet of said particle filter 33 via a third section 37 of the exhaust pipe 23. The outlet of said SCR catalytic converter 35 opens into a fourth section 39 of said exhaust pipe 23.

It should be noted that the sensors shown here represent only a certain exemplary assortment and in actual operation further sensors can be disposed in the region of the exhaust gas pipe. A metering device 41, which can be controlled by the control unit 17, for injecting a liquid urea solution from a separate tank (not depicted) projects into the third section 37 of the exhaust gas pipe 23. An actuator of the metering device 41 is connected to an outlet of the control unit 17. A warning signal device 42, for example an error lamp, is additionally connected to said control unit 17 in order to indicate a malfunction of a component of the exhaust gas aftertreatment system 13 which has possibly been diagnosed.

The exhaust gas 24 discharged by the internal combustion engine 15 has a very high NO content (approximately 90%). The SCR catalytic converter 35, which is disposed in the direction of flow at the end of the exhaust gas pipe 23, works most efficiently if the total quantity of the nitrogen oxides in the exhaust gas consists at least approximately of NO to 50% and of $NO_2$ to 50%. The oxidation catalytic converter 29 disposed in the exhaust gas pipe 23 therefore performs the task of oxidizing NO to $NO_2$ such that the 50:50 ratio of the NO proportion to the $NO_2$ proportion of the nitrogen oxide concentration upstream of said SCR catalytic converter 35 is achieved.

The nitrogen oxide sensors 31 and 32 are provided for monitoring the conversion capacity of NO to $NO_2$ in the oxidation catalytic converter 29. The control unit 17 is set up, in particular programmed, for the purpose of carrying out the monitoring method according to the invention.

In a preferred embodiment, the equipping of control unit 17 by means of loading a computer program with the features of the independent computer program claim from a computer program product with the features of the independent computer program product claim. By a computer program product, each file or collection of files is thereby understood which contains the computer program in stored form as well as each carrier, which contains such a file or collection of files.

The nitrogen oxide sensors 31 and 32 are capable of evaluating a total nitrogen oxide proportion in the exhaust gas. A characteristic diagram, which shows a variation in sensitivity of the sensors 31 and 32 with respect to NO and $NO_2$, is depicted in FIG. 2 to accurately illustrate the functional capability of said nitrogen oxide sensors 31 and 32.

Figure 2:
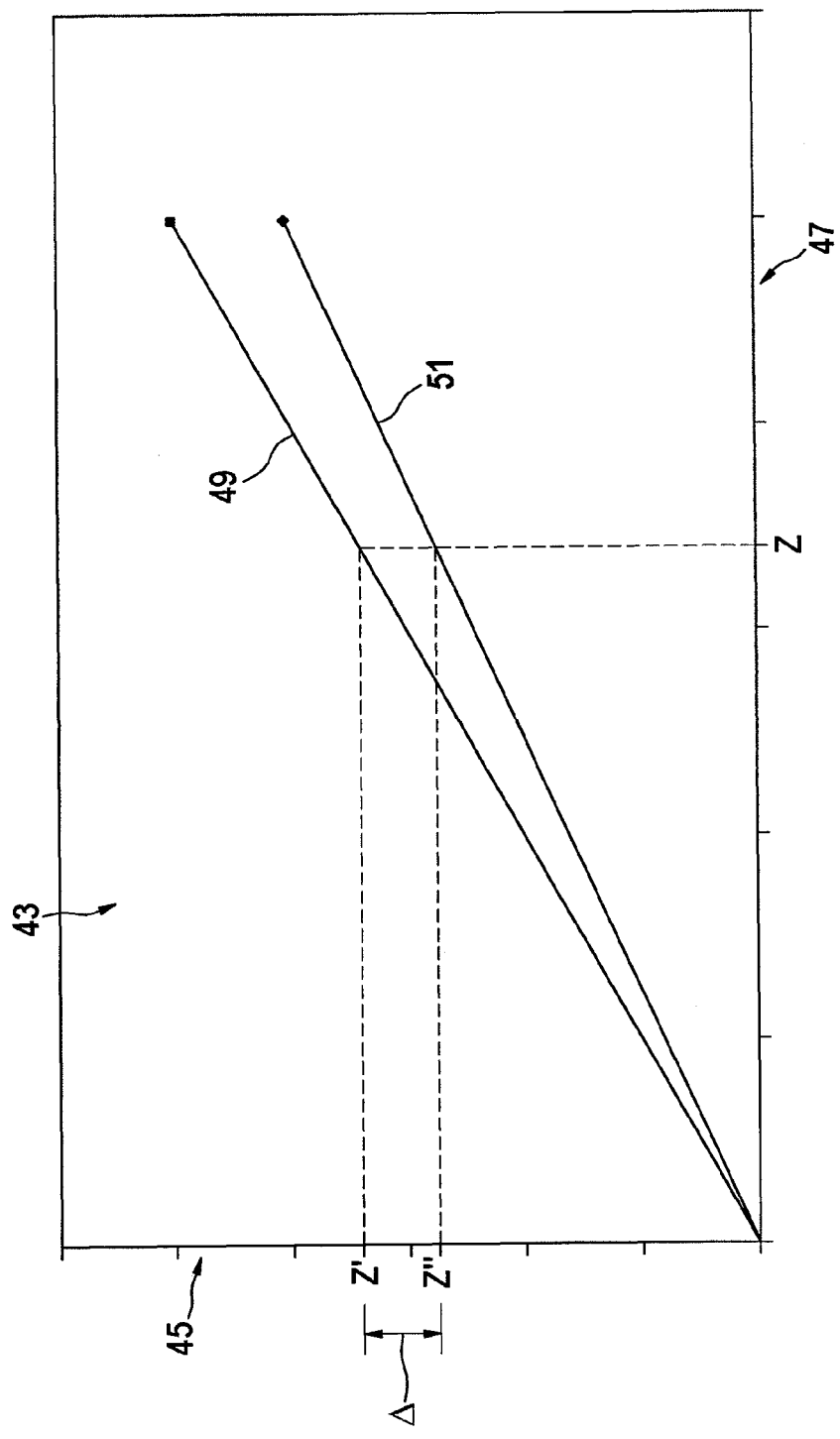

FIG. 2 shows the characteristic diagram 43, which shows the variation in sensitivity of the nitrogen oxide sensor 31 or 32 to NO and $NO_2$. Possible values of the signal Z', Z" associated with the nitrogen oxide sensor 31 or 32 are plotted on the ordinate 45 in the characteristic diagram 43. The abscissa 47 shows the nitrogen oxide concentration in the exhaust gas. Said characteristic diagram 43 has two straight lines, the steeper straight line 49 representing the nitrogen oxide concentration measured by the nitrogen oxide sensor 31 or 32 at a NO proportion of 100% of the nitrogen oxide concentration Z and the flatter straight line 51 the nitrogen oxide concentration at a $NO_2$ proportion of 100% of said nitrogen oxide concentration Z.

The function of the nitrogen oxide sensor 31 or 32 is explained at a nitrogen oxide concentration Z (Abscissa 47), which is assumed by way of example. At an assumed NO proportion of 100% of the nitrogen oxide concentration Z, the nitrogen oxide sensor 31 or 32 would deliver a signal value of Z' according to a mapping by the straight line 49. On the other hand, the nitrogen oxide senor 31 or 32 would deliver a signal Z" deviating from Z' at a $NO_2$ proportion of 100% of the nitrogen oxide concentration Z according to a mapping by the straight line 51.

The signals of the nitrogen oxide sensors 31 and 32 therefore depend not only on the nitrogen oxide concentration in the exhaust gas but additionally vary as the NO and $NO_2$ proportions vary at an otherwise constant total nitrogen oxide concentration. A functioning exhaust gas aftertreatment component 29 does not in fact affect the total nitrogen oxide concentration. It does, however, enlarge the $NO_2$ proportion at the expense of the NO proportion. This effect in combination with the variation in sensitivity of the nitrogen oxide sensors 31 and 32 for NO and $NO_2$ is utilized in the present invention for assessing the functional capability of the exhaust gas aftertreatment component.

During the operation of the internal combustion engine 15, discharged exhaust gas 24 has a very high NO concentration. The nitrogen oxide sensor 31 disposed upstream of the oxidation catalytic converter measures this nitrogen oxide concentration and delivers a value between Z' and Z", which, however, lies very close to Z' on account of the very high NO concentration and is therefore comparatively large.

The NO in the exhaust gas 24 is partially oxidized to $NO_2$ in the oxidation catalytic converter 29. That means that the exhaust gas 34 downstream of the functioning oxidation catalytic converter 29 has a reduced NO proportion, and in return the $NO_2$ proportion is increased. The nitrogen oxide sensor 32 disposed downstream of the said oxidation catalytic converter 29 therefore now ascertains a value between Z' and Z", which, however, lies close to Z" on account of the high $NO_2$ concentration and is for this reason comparatively smaller. In a properly working oxidation catalytic converter 29, the nitrogen oxide sensors 31 and 32 therefore ascertain signal values, which vary by a difference Δ. If the oxidation catalytic converter 29 can no longer oxidize NO into $NO_2$ on account of a malfunction, no difference Δ thus occurs between the two nitrogen oxide sensor signals.

In order to obtain reliable signal values, the signal values and the difference Δ are ascertained over a predetermined length of time during a suitable operating phase and are subsequently averaged. If the mean value lies below a predetermined threshold value, the oxidation catalytic converter 29 is designated to be faulty. This is then, for example, reported to the onboard diagnostics via the warning signal device 42.

The averaging is omitted in one embodiment. In its place, a cumulative value of the difference Δ, which is formed over the allocated length of time, is compared with a predetermined threshold value. The cumulative value is formed in one embodiment as an integral of the difference Δ with respect to time or as a sum of discrete values of the difference Δ. The predetermined length of time is calculated in one embodiment such that it elapses in one single operating phase. A value of 30 seconds is recommended as a minimum. Said predetermined length of time can also be alternatively calculated such that the formation and further processing of the difference Δ to an averaged value or to a cumulative value take place over a plurality of operating phases. The value achieved in each case is stored at the end of an operating phase. A further averaging or summing of values occurs at the beginning of a succeeding operating phase or upon exceeding the light off temperature in the succeeding operating phase, the previously stored value being assumed as the base value. This is then particularly advantageous if the difference Δ is very small.

If a plurality of oxidizing exhaust gas aftertreatment components is provided in an exhaust gas system, a nitrogen oxide sensor can be disposed in a further embodiment, which is not depicted here, upstream of and downstream of each oxidizing exhaust gas aftertreatment component. In so doing, a separate monitoring can be implemented in each case for each exhaust gas aftertreatment component according to the method described above.

Figure 3:
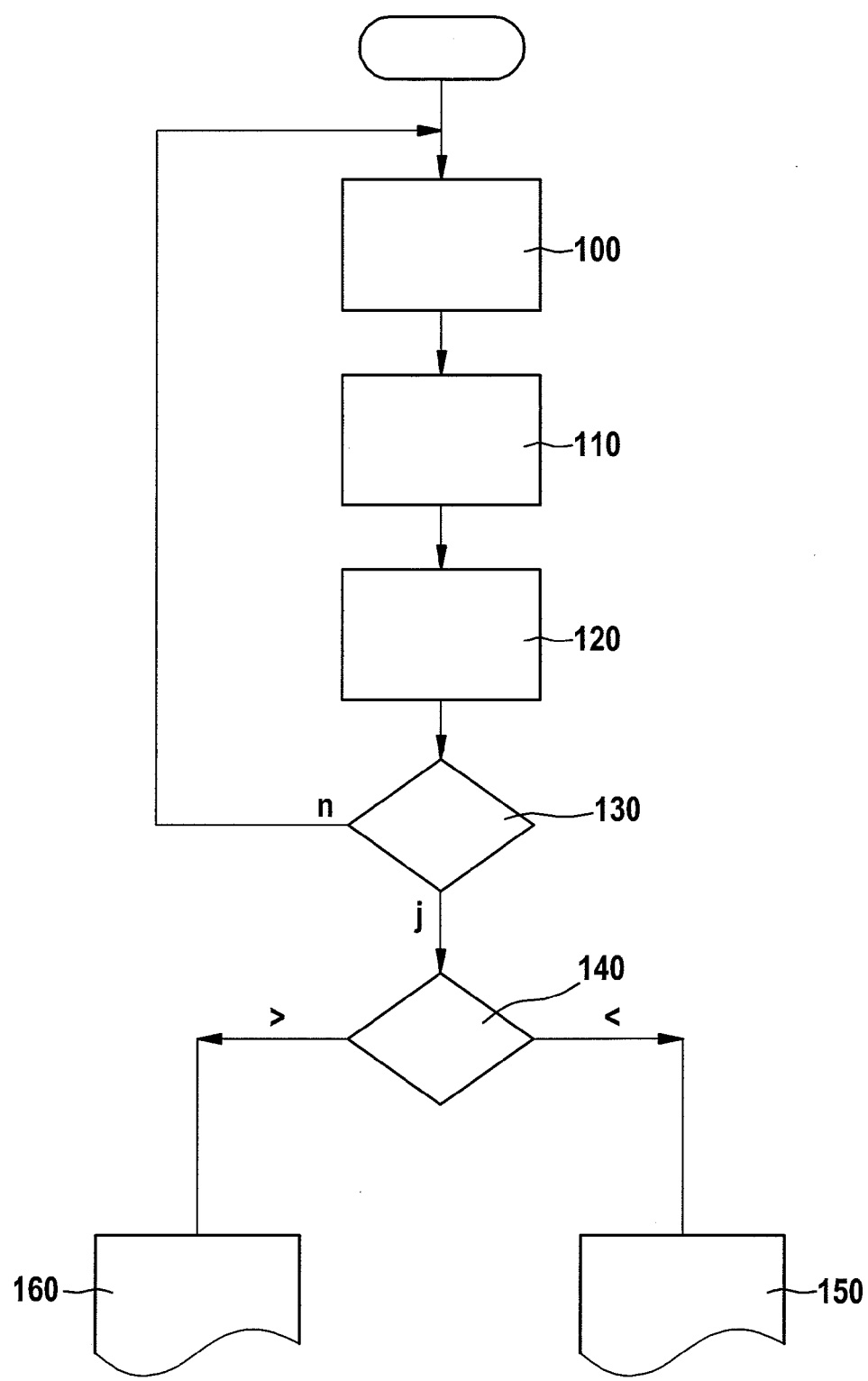
FIG. 3 a flow diagram of the method.

FIG. 3 shows the course of events of the method in a flow diagram. In step 100, values of the respective total nitrogen oxide concentration in the exhaust gas Z' and Z" are ascertained via the signals of the nitrogen oxide sensors 31 and 32. The difference Δ between Z' and Z" is subsequently formed in the control unit 17 in step 110. The calculation of the difference is carried out several times during one or a plurality of defined operating phases of the motor vehicle and is added up or averaged (step 120) depending on the embodiment. The calculating of the difference is carried out during a predetermined length of time. It is therefore ascertained in the query 130 whether the predetermined length of time has been achieved. If this is not the case, a new measurement is then initiated. If the predetermined length of time has elapsed, the mean value formed previously, respectively the cumulative value, is compared with a threshold value deposited in the control unit 17 in query 140. If the threshold value is smaller than the value ascertained via the nitrogen oxide sensors 31 and 32, the exhaust gas aftertreatment component 29 is assessed to be in working order (step 150). If the threshold value is larger than said ascertained value via said nitrogen oxide sensors 31 and 32, an insufficient conversion capacity of the monitored exhaust gas aftertreatment component 29 thus exists (step 160). This malfunction is, if need be after statistically ensuring the results, reported to the onboard diagnostic system via the warning signal device 42.

The invention claimed is:

1. A storage device encoding computer executable instructions that, when executed by at least one processor, perform a method for monitoring a pollutant conversion capacity of a catalytically coated, oxidizing catalyst in an exhaust gas system of an internal combustion engine, the method comprising:
   evaluating signals from each of two nitrogen oxide sensors disposed in a flow path of the exhaust gas, wherein one nitrogen oxide sensor is located upstream of the oxidizing catalyst, and one nitrogen oxide sensor is located downstream of the oxidizing catalyst;
   comparing at least two signals from the nitrogen oxide sensors; and
   ascertaining a capacity of said oxidizing catalyst for converting NO to $NO_2$ from the comparison of the two signals of said nitrogen oxide sensors, wherein an operating phase of the internal combustion engine is utilized to ascertain the conversion of NO to $NO_2$, in which in an optimally working exhaust gas aftertreatment component an $NO_2$ proportion of an entire quantity of nitrogen oxides that has a high magnitude in the exhaust gas is expected downstream of said exhaust gas aftertreatment component, the operating phase being defined by operating parameters of the internal combustion engine, wherein the $NO_2$ proportion is greater than 0.5, wherein a temporal mean value of a difference (Δ) of the two signals of the nitrogen oxide sensors is formed over a predetermined length of time, and wherein the temporal mean value is formed over a plurality of operating phases of the internal combustion engine, which are separated from one another, to ascertain the NO/$NO_2$ conversion capacity.

2. The method according to claim 1, wherein the temporal mean value is compared with a designated threshold value, and ascertaining the capacity of the oxidizing catalyst comprises assessing the oxidizing catalyst as sufficiently functional if the mean value is greater than the designated threshold value.

3. The method according to claim 1, wherein the operating conditions, in which a high $NO_2$ proportion in the exhaust gas is expected downstream of the oxidizing catalyst, are actively set in a test operation.

4. The method of claim 1, wherein the operating parameters include an engine rotational speed, an engine load, or an exhaust gas mass flow.

5. The method of claim 1, wherein the operating parameters include an engine rotational speed and an engine load.

6. An open-loop control device, which is equipped to monitor a pollutant conversion capacity of a catalytically coated, oxidizing catalyst in an exhaust gas system of an internal combustion engine, the open-loop control device comprising:
   two nitrogen oxide sensors, wherein one nitrogen oxide sensor is disposed in a flow path of the exhaust gas upstream of the oxidizing catalyst and one nitrogen oxide sensor is disposed downstream of the oxidizing catalyst; and
   a control unit configured to:
      receive a signal from each of the nitrogen oxide sensors; and
      ascertain a capacity of said oxidizing catalyst to convert NO to $NO_2$ from a comparison of the two signals of said nitrogen oxide sensors, wherein an operating phase of the internal combustion engine is utilized to ascertain the conversion of NO to $NO_2$, in which in an optimally working exhaust gas aftertreatment component an $NO_2$ proportion of an entire quantity of nitrogen oxides that has a high magnitude in the exhaust gas is expected downstream of said exhaust gas aftertreatment component, the operating phase being defined by operating parameters of the internal combustion engine, wherein the $NO_2$ proportion is greater than 0.5, wherein a temporal mean value of a difference (Δ) of the two signals of the nitrogen oxide sensors is formed over a predetermined length of time, and wherein the temporal mean value is formed over a plurality of operating phases of the internal combustion engine, which are separated from one another, to ascertain the NO/$NO_2$ conversion capacity.

7. A closed-loop control device, which is equipped to monitor a pollutant conversion capacity of a catalytically coated, oxidizing catalyst in an exhaust gas system of an internal combustion engine, the closed-loop control device comprising:
   two nitrogen oxide sensors, wherein one nitrogen oxide sensor is disposed in a flow path of the exhaust gas upstream of the oxidizing catalyst and one nitrogen oxide sensor is disposed downstream of the oxidizing catalyst; and
   a control unit configured to:
      receive a signal from each of the nitrogen oxide sensors, and
      ascertain a capacity of said oxidizing catalyst to convert NO to $NO_2$ from a comparison of the two signals of said nitrogen oxide sensors, wherein an operating phase of the internal combustion engine is utilized to ascertain the conversion of NO to $NO_2$, in which in an optimally working exhaust gas aftertreatment component an $NO_2$ proportion of an entire quantity of nitrogen oxides that has a high magnitude in the exhaust gas is expected downstream of said exhaust gas aftertreatment component, the operating phase being defined by operating parameters of the internal combustion engine, wherein the $NO_2$ proportion is greater than 0.5, wherein a temporal mean value of a difference ($\Delta$) of the two signals of the nitrogen oxide sensors is formed over a predetermined length of time, and wherein the temporal mean value is formed over a plurality of operating phases of the internal combustion engine, which are separated from one another, to ascertain the $NO/NO_2$ conversion capacity.

8. A storage device encoding computer executable instructions that, when executed by at least one processor, perform a method for monitoring a pollutant conversion capacity of a catalytically coated, oxidizing catalyst in an exhaust gas system of an internal combustion engine, the method comprising:

evaluating signals from each of two nitrogen oxide sensors disposed in a flow path of the exhaust gas wherein one nitrogen oxide sensor is located upstream of the oxidizing catalyst, and one nitrogen oxide sensor is located downstream of the oxidizing catalyst;

comparing at least two signals from the nitrogen oxide sensors; and ascertaining a capacity of said oxidizing catalyst for converting NO to $NO_2$ from the comparison of the two signals of said nitrogen oxide sensors, wherein an operating phase of the internal combustion engine is utilized to ascertain the conversion of NO to $NO_2$, in which in an optimally working exhaust gas aftertreatment component an $NO_2$ proportion of an entire quantity of nitrogen oxides that has a high magnitude in the exhaust gas is expected downstream of said exhaust gas aftertreatment component, the operating phase being defined by operating parameters of the internal combustion engine;

wherein a temporal mean value of a difference of the two signals of the nitrogen oxide sensors is formed over a predetermined length of time; and wherein utilizing the operating phase of the internal combustion engine comprises a condition where a high $NO_2$ proportion in the exhaust gas is expected downstream of said oxidizing catalyst, wherein the $NO_2$ proportion is greater than 0.5, wherein a temporal mean value of a difference ($\Delta$) of the two signals of the nitrogen oxide sensors is formed over a predetermined length of time, and wherein the temporal mean value is formed over a plurality of operating phases of the internal combustion engine, which are separated from one another, to ascertain the $NO/NO_2$ conversion capacity.

* * * * *